US010477193B2

(12) United States Patent
Gao et al.

(10) Patent No.: US 10,477,193 B2
(45) Date of Patent: Nov. 12, 2019

(54) THREE DIMENSIONAL DISPLAY DEVICE AND METHOD OF DRIVING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jian Gao, Beijing (CN); Xue Dong, Beijing (CN); Xiaochuan Chen, Beijing (CN); Wenqing Zhao, Beijing (CN); Pengcheng Lu, Beijing (CN); Xiaochen Niu, Beijing (CN); Ming Yang, Beijing (CN); Qian Wang, Beijing (CN); Pengpeng Wang, Beijing (CN); Rui Xu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/502,934

(22) PCT Filed: Aug. 10, 2016

(86) PCT No.: PCT/CN2016/094401
§ 371 (c)(1),
(2) Date: Feb. 9, 2017

(87) PCT Pub. No.: WO2017/092397
PCT Pub. Date: Jun. 8, 2017

(65) Prior Publication Data
US 2018/0270475 A1    Sep. 20, 2018

(30) Foreign Application Priority Data
Dec. 3, 2015    (CN) .......................... 2015 1 0882592

(51) Int. Cl.
*H04N 13/315*    (2018.01)
*G02B 27/22*    (2018.01)
*H04N 13/398*    (2018.01)

(52) U.S. Cl.
CPC .......... *H04N 13/315* (2018.05); *G02B 27/22* (2013.01); *H04N 13/398* (2018.05)

(58) Field of Classification Search
CPC .. H04N 13/302; H04N 13/351; H04N 13/315; H04N 13/398; H04N 13/356; H04N 13/359
(Continued)

(56) References Cited

U.S. PATENT DOCUMENTS 6,859,240 B1    2/2005    Brown et al.
2012/0026204 A1    2/2012    Chun et al.
(Continued)

FOREIGN PATENT DOCUMENTS

CN    103424874 A    12/2013
CN    104834104 A    8/2015
(Continued)

OTHER PUBLICATIONS

1St Chinese Office Action, English Translation.
(Continued)

*Primary Examiner* — Jared Walker
(74) *Attorney, Agent, or Firm* — Brooks Kushman P.C.

(57) ABSTRACT

A 3D display device and a method of driving the same are disclosed in the present disclosure. An electroluminescence display panel instead of a conventional backlight module is adopted to be arranged behind the liquid crystal display panel. In the 3D display mode, light emitting areas and black areas alternately arranged in both the row direction and the column direction are formed in the electroluminescent display panel, so that an abnormal grating structure is formed.
(Continued)

In the 3D display mode, the first sub-pixels corresponding to the same light emitting area are controlled to display different gray level information so that the left and right eyes of a person located at two viewpoints receive an image of different gray level information. Therefore, stereoscopic vision is created and a naked-eye 3D display at the sub-pixel level is achieved.

13 Claims, 4 Drawing Sheets

(58) Field of Classification Search
USPC .......................................................... 348/54
See application file for complete search history.

(56) References Cited

U.S. PATENT DOCUMENTS

| | | | |
|---|---|---|---|
| 2014/0063383 A1 | 3/2014 | Xie | |
| 2014/0111712 A1* | 4/2014 | Wu | G02B 27/26 349/15 |
| 2015/0070478 A1 | 3/2015 | Wei | |
| 2015/0332640 A1* | 11/2015 | Liao | H04N 13/356 345/694 |
| 2017/0084213 A1 | 3/2017 | Yang et al. | |
| 2017/0139218 A1 | 5/2017 | Lu et al. | |

FOREIGN PATENT DOCUMENTS

| | | |
|---|---|---|
| CN | 104849870 A | 8/2015 |
| CN | 105093546 A | 11/2015 |
| CN | 105093547 A | 11/2015 |
| CN | 105093553 A | 11/2015 |
| CN | 105334632 A | 2/2016 |
| CN | 105353559 A | 2/2016 |

OTHER PUBLICATIONS

International Search Report and Written Opinion, English Translation.
CN105334632A, English Abstract and Machine Translation.
CN105353559A, English Abstract and Machine Translation.
CN105093553A, English Abstract and U.S. Equivalent U.S. Pub. No. 2017/0084213.
CN105093547A, English Abstract.
CN104834104A, English Abstract and U.S. Equivalent U.S. Pub. No. 2017/0139218.
CN104849870A, English Abstract and Machine Translation.
CN105093546A, English Abstract.
CN103424874A, English Abstract and U.S. Equivalent U.S. Pub. No. 2015/0070478.
First Office Action for Chinese Application No. 201510882592.9, dated Apr. 5, 2017, 8 Pages.
International Search Report and Written Opinion for Application No. PCT/CN2016/094401, dated Oct. 17, 2016, 13 Pages.

* cited by examiner

THREE DIMENSIONAL DISPLAY DEVICE AND METHOD OF DRIVING THE SAME

CROSS-REFERENCE TO RELATED APPLICATIONS

This application is the U.S. national phase of PCT Application No. PCT/CN2016/094401 filed on Aug. 10, 2016, which claims priority to Chinese Patent Application No. 201510882592.9 filed on Dec. 3, 2015, the disclosures of which are incorporated in their entirety by reference herein.

TECHNICAL FIELD

The present disclosure relates to the field of three dimensional display technologies, in particular to a three dimensional display device and a method of driving the same.

BACKGROUND

The main principle of three dimensional (3D) display technologies is to allow a viewer's left and right eyes to receive images with minor differences, i.e., left and right views. The two views are combined through the analysis of the brain so that the viewer perceives depths of objects in the views, thereby generating a three-dimensional sense.

Early 3D display devices require users to wear corresponding 3D glasses. In recent years, naked-eye 3D display devices receive great attention. There are generally two types of devices used for achieving the naked-eye 3D display: slit grating 3D display devices and micro-lens array display devices. The slit grating 3D display devices are also called parallax barrier 3D display devices. The parallax barrier technology is achieved using a switching liquid crystal display, a polymer liquid crystal layer and a polarization layer. A voltage difference between electrodes of upper and lower substrates of the switching liquid crystal display screen is controlled so that the liquid crystal molecules in the polymer liquid crystal layer are rotated, thereby producing opaque stripes, i.e. parallax barriers. When the switching liquid crystal display screen is turned on, due to the presence of these parallax barriers, views that are seen by the left eye can be seen only by the left eye and the right eye is shielded; and views that are seen by the right eye can be seen only by the right eye and the left eye is shielded. When the liquid crystal display screen is turned off, no parallax barrier exists in the display panel, and thus the 3D display device is converted into a normal 2D display device.

At present, the naked-eye 3D display devices in the related art requires additional 3D gratings capable of realizing parallax barriers in front of the display panel, which is not conducive to the thinning and lightening of the three-dimensional display devices.

SUMMARY

In view of this, the present disclosure provides a 3D display device and a method of driving the same, so as to provide a lightened and thinned 3D display device.

Therefore, the present disclosure provides a 3D display device. The 3D display device includes: a liquid crystal display panel, and an electroluminescence display panel behind the liquid crystal display panel. The electroluminescence display panel includes a plurality of first areas and a plurality of second areas, the first areas and the second areas are closely arranged and alternately arranged in both of a row direction and a column direction; and the first areas serve as light emitting areas and the second areas serve as black areas in a 3D display mode. The liquid crystal display panel includes a plurality of first sub-pixels arranged in an array; every at least two adjacent first sub-pixels in a row correspond to one of the first areas; and in the 3D display mode, among the first sub-pixels corresponding to an identical one of the first areas, the first sub-pixels for providing gray level information of an image for different viewpoints display different gray level information.

In a possible embodiment, in the above-mentioned 3D display device provided by the embodiment of the present disclosure, the first sub-pixels corresponding to the identical one of the first areas display an identical gray level in a 2 dimensional (2D) display mode.

In a possible embodiment, in the above-mentioned 3D display device provided by the embodiment of the present disclosure, the liquid crystal display panel is a black-and-white liquid crystal display panel; the first areas in the electroluminescence display panel have three different light colors; and among two adjacent rows or columns of the first areas, every two adjacent first areas in a row, in a column or in a diagonal direction have different light colors.

In a possible embodiment, in the above-mentioned 3D display device provided by the embodiment of the present disclosure, the second areas in the electroluminescence display panel serve as the black areas in a 2D display mode.

In a possible embodiment, in the above-mentioned 3D display device provided by the embodiment of the present disclosure, the first areas and the second areas are second sub-pixels; or, the first areas are the second sub-pixels, and the second areas are areas between the second sub-pixels and covered by a black matrix.

In a possible embodiment, in the above-mentioned 3D display device provided by the embodiment of the present disclosure, in a 2D display mode, the light color of each of the second areas in the electroluminescence display panel is identical to the light color of the adjacent first area that is in the same row as the each of the second areas and on either side of the each of the second areas.

In a possible embodiment, in the above-mentioned 3D display device provided by the embodiment of the present disclosure, the first areas and the second areas are second sub-pixels.

In a possible embodiment, in the above-mentioned 3D display device provided by the embodiment of the present disclosure, a center position of each of the first areas coincides with a center position of an area where at least two corresponding adjacent first sub-pixels in a row are located.

In a possible embodiment, in the above-mentioned 3D display device provided by the embodiment of the present disclosure, a center position of each of the first areas coincides with a center position of an area where one of at least two corresponding adjacent first sub-pixels in a row is located.

In a possible embodiment, in the above-mentioned 3D display device provided by the embodiment of the present disclosure, each of the first areas is square or circular, and each of the first sub-pixels has an aspect ratio of 1:1.

The present disclosure further provides a method of driving the above-mentioned 3D display device provided by the embodiments of the present disclosure. The method includes: in a 3D display mode, controlling the first areas in the electroluminescence display panel behind the liquid crystal display panel to emit light; and controlling the first sub-pixels for providing gray level information of an image for different viewpoints, among the first sub-pixels of the liquid crystal display panel corresponding to an identical one of the first areas, to display different gray level information.

In a possible embodiment, in the above-mentioned method provided by the embodiment of the present disclosure, the method further includes: in a 2D display mode, controlling the first sub-pixels of the liquid crystal display panel corresponding to the identical one of the first areas to display identical gray level information.

In a possible embodiment, in the above-mentioned method provided by the embodiment of the present disclosure, the first areas and the second areas are second sub-pixels, and the method further includes: in the 2D display mode, controlling each of the second areas of the electroluminescence display panel to emit light the same as the adjacent first area in the same row as the each of the second areas and on either side of the each of the second areas.

The embodiments of the present disclosure have the following beneficial effects: an electroluminescence display panel instead of a conventional backlight module is adopted to be arranged behind the liquid crystal display panel so as to allow the 3D display device to be thinner and lighter. In the 3D display mode, light emitting areas and black areas alternately arranged in both the row direction and the column direction are formed in the electroluminescent display panel, so that an abnormal grating structure (which refers to a non-stripe grating structure) is formed. Therefore, in addition to providing backlight for the liquid crystal display panel, the electroluminescent display panel also serves as a rear 3D grating, and extra 3D gratings in front of the liquid crystal display panel are omitted, which facilitates the overall light and thin design of the 3D display device and facilitates the addition of functions such as a touch control function to the front liquid crystal display panel. Since the luminance of the electroluminescence display panel is nearly zero in the black state, the black-and-white state contrast ratio is relative high and the formed 3D grating easily obtains low-crosstalk 3D displays. Since each light emitting area (first area) in the electroluminescent display panel corresponds to at least two adjacent first sub-pixels in a row in the liquid crystal display panel and the individual first sub-pixels are used to provide different gray level information of a viewpoint image, the first sub-pixels corresponding to the same light emitting area (first area) are controlled in the 3D display mode to display different gray level information so that two adjacent viewpoints receive images of different gray level information. The left and right eyes of a person located at the two viewpoints receive two different images and the two different images are combined in the brain as one image through the vision of the eyes, thereby resulting in stereoscopic vision and achieving a naked-eye 3D display at the sub-pixel level.

DETAILED DESCRIPTION

Figure 1:
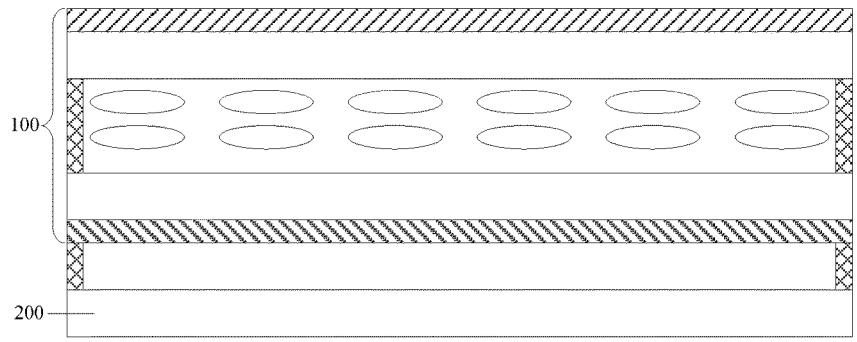
FIG. 1 illustrates a schematic diagram of a 3D display device according to an embodiment of the present disclosure.

Embodiments of a 3D display device and method of driving the same provided by the present disclosure will be described in detail with reference to accompanying drawings.

The shapes of various regions in the drawings do not indicate true scales, but are merely illustrative of the present disclosure.

As shown in FIG. 1, an embodiment of the present disclosure provides a 3D display device which includes a liquid crystal display panel 100 and an electroluminescent display panel 200 arranged under the liquid crystal display panel 100.

Figure 2A:
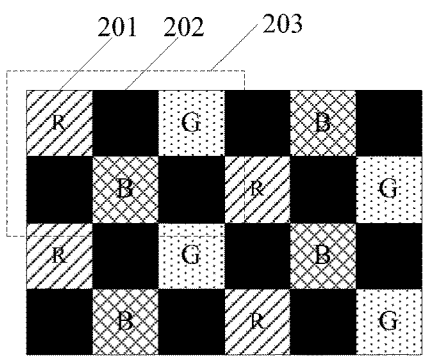
FIGS. 2a and 2b illustrate schematic diagrams of an electroluminescent display panel in a 3D display device according to an embodiment of the present disclosure.
Figure 2B:
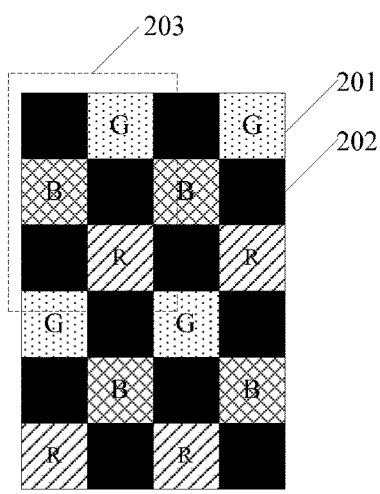

As shown in FIGS. 2a and 2b, the electroluminescent display panel 200 has a plurality of first areas 201 and a plurality of second areas 202. The plurality of first areas 201 and the plurality of second areas 202 are closely arranged and alternately arranged in both the row direction and the column direction. In a 3D display mode, the first areas 201 are light emitting areas and the second areas 202 are black areas.

Figures 3A, 3B, 4:
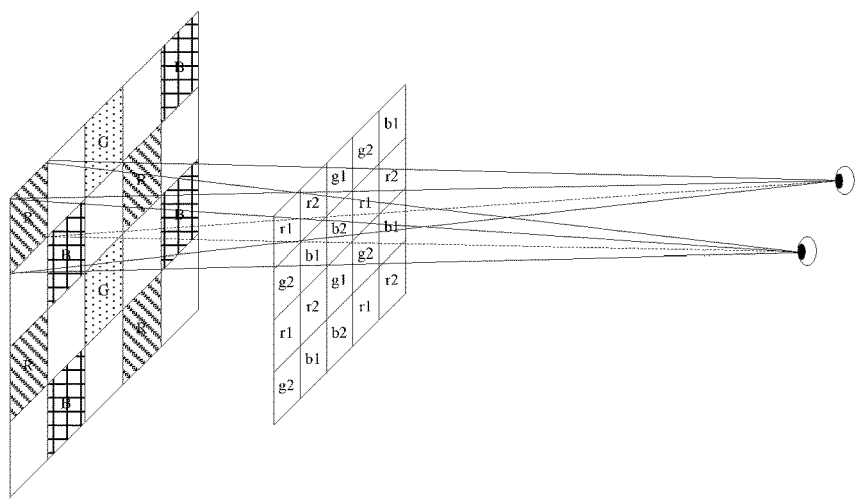
FIGS. 3a and 3b illustrate schematic diagrams of a liquid crystal display panel in a 3D display device according to an embodiment of the present disclosure.
FIG. 4 is a schematic diagram illustrating the principle of a 3D display device according to an embodiment of the present disclosure.

As shown in FIGS. 3a and 3b, the liquid crystal display panel 100 has a plurality of first sub-pixels 101 arranged in an array. At least two adjacent first sub pixels 101 in a row correspond to one first area 201. In the 3D display mode, among the first sub-pixels 101 corresponding to the same first area 201, individual first sub-pixels 101 for providing different gray level information of a view image display different gray levels. FIGS. 3a and 3b illustrate an example in which two adjacent first sub-pixels 101 in a row correspond to one first area 201. FIG. 3a illustrates the arrangement of the first sub-pixels 101 corresponding to the light emitting areas (first areas 201) shown in FIG. 2a, and FIG. 3b illustrates the arrangement of the first sub-pixels 101 corresponding to the light emitting areas (first areas 201) shown in FIG. 2b. In the liquid crystal display panel 100, adjacent first sub-pixels r1 and r2 in a row correspond to a light emitting area R in the electroluminescent display panel 200, adjacent first sub-pixels g1 and g2 in a row correspond to a light emitting area G, and adjacent first sub-pixels b1 and b2 in a row correspond to a light emitting area B.

The above-mentioned 3D display device provided by the embodiment of the present disclosure arranges under the liquid crystal display panel 100 the electroluminescent display panel 200 instead of a conventional backlight module, so as to allow the 3D display device to be thinned and lightened. In the 3D display mode, light emitting areas and black areas alternately arranged in both the row direction and the column direction are formed in the electroluminescent display panel 200, so that an abnormal grating structure (which refers to a non-stripe grating structure) is formed. Therefore, in addition to providing backlight for the liquid crystal display panel 100, the electroluminescent display panel 200 also serves as a rear 3D grating, and extra 3D gratings in front of the liquid crystal display panel 100 are omitted, which facilitates the overall light and thin design of the 3D display device and facilitates the addition of functions such as a touch control function to the front liquid crystal display panel 100. Since the luminance of the electroluminescence display panel 200 is nearly zero in the black state, the black-and-white state contrast ratio is relative high and the formed 3D grating easily obtains low-crosstalk 3D displays.

Figure 5A:
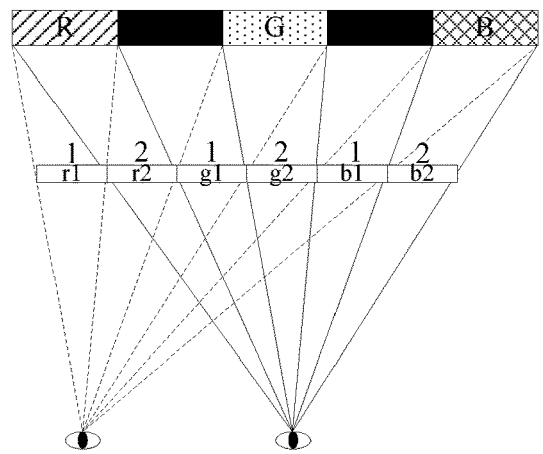
FIGS. 5a and 5b are schematic diagrams illustrating the principle of displaying a 3D image by a 3D display device according to an embodiment of the present disclosure.

As shown in FIG. 4, in the above-mentioned 3D display device provided by the embodiment of the present disclosure, since each light emitting area (first area 201) in the electroluminescence display panel corresponds to at least two adjacent first sub-pixels 101 in a row and the first sub-pixels 101 are used to provide gray level information of the image for different viewpoints, the first sub-pixels 101 corresponding to the same light emitting area (first area 201) are controlled in the 3D display mode to display different gray level information so that two adjacent viewpoints receive images having different gray level information, as shown in FIG. 5a. The left and right eyes of a person located at the two viewpoints receive two different images and the two different images are combined in the brain as one image through the vision of the eyes, thereby resulting in stereoscopic vision and achieving a naked-eye 3D display at the sub-pixel level. FIG. 5a illustrates an instance of two viewpoints by way of an example in which one light emitting area corresponds to two first sub-pixels. In FIG. 5a, "1" and "2" are used to distinguish different gray levels and the left eye receives image information having a gray level of 1 and the right eye receives image information having a gray level of 2. In specific implementations, one light emitting area may correspond to three first sub-pixels, i.e. achieving the instance of three viewpoints, and one light emitting area may correspond to four first sub-pixels, i.e. achieving the instance of four viewpoints or two viewpoints (two adjacent first sub-pixels constitute one viewpoint) and so on.

Figure 5B:
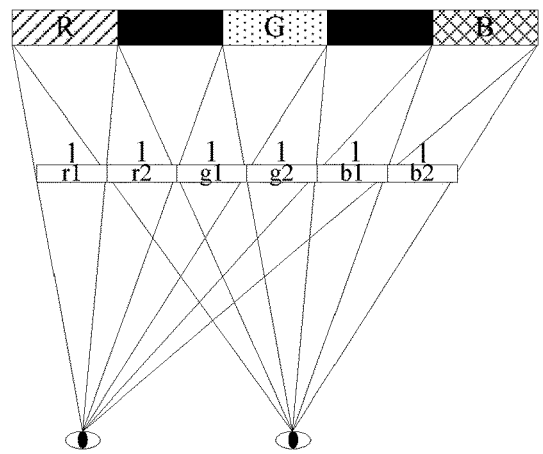

Further, when the above-mentioned 3D display device provided by the embodiment of the present disclosure is required to perform a 2D image display, i.e. as shown in FIG. 5b, in the 2D display mode, it is only necessary to adjust the first sub-pixels 101 corresponding to the same light emitting area (first area 201) in the liquid crystal display panel 100 to display the same gray level so that the left and right eyes of a person located at different viewpoints see the same image and the 2D display is achieved. FIG. 5b illustrates the instance of two viewpoints by way of an example in which one light emitting area corresponds to two first sub-pixels and "1" indicates the same gray level.

In specific implementations, individual light emitting areas in the electroluminescence display panel 200 of the above-mentioned 3D display device provided by the embodiment of the present disclosure may emit light of the same color, i.e., the white light. In this circumstance, the electroluminescence display panel 200 only severs as a backlight module for providing the luminance and the 3D grating. Correspondingly, individual sub-pixels 101 in the liquid crystal display panel 100 also provide tone information in addition to gray level information of images for different viewpoints. Therefore, three-primary-color color filters are provided for the first sub-pixels 101 in the liquid crystal display panel 100 to achieving the adjustment of the tone. The color filters provided in the liquid crystal display panel 100 affect the light transmittance, which is detrimental to increasing the luminance of the 3D display device. In order to achieve the 3D display, the color filters of the first sub-pixels corresponding to the same light emitting area (first area 201) in the liquid crystal display panel 100 are required to be the same, and thus the 3D display device may achieve the 3D display only in one direction. If the 3D display device is rotated by 90 degrees, the first sub-pixels corresponding to the same light emitting area (first area 201) and having the same color filter are changed from adjacent in a row to adjacent in a column so that the 3D display requirement that different viewpoints are located in the same horizontal plane is not satisfied and the 3D display cannot be achieved.

In view of the above-mentioned problems, in the 3D display device provided by the embodiment of the present disclosure, the liquid crystal display panel 100 optionally adopts a black-and-white liquid crystal display panel, i.e. no color filter is provided in the liquid crystal display panel 100, and thus there does not exist the problem that the arrangement positions of the color filters limit the directions in which the 3D display device achieves the 3D display and the 3D display may be also achieved when the screen is rotated by 90 degrees. Correspondingly, the first areas 201 (light emitting areas) in the electroluminescence display panel 200 have three different light colors, e.g. R, G and B. In order to reduce the differences between the instance in which the screen is rotated by 90 degrees and the instance in which the screen is not rotated, the electroluminescence display panel 200 adopts such an arrangement in which one pixel 203 is defined by RGB light emitting areas which are arranged in a triangle as shown in FIGS. 2a and 2b. Thus, it is necessary to ensure that in two adjacent rows or columns of first areas 201, the light colors of two adjacent first areas 201 in a row, in a column or in a diagonal direction are different. FIG. 2a illustrates an arrangement adopted in the electroluminescence display panel 200, in which one pixel 203 is defined by RGB light emitting areas which are arranged in a triangle. In this arrangement, in two adjacent rows of first areas 201, the light colors of two adjacent first areas 201 in the row, in the column or in the diagonal direction are different. FIG. 2b illustrates the instance when FIG. 2a is rotated by 90 degrees, in which in two adjacent columns of first areas 201 of the electroluminescence display panel 200, the light colors of two adjacent first areas 201 in the row, in the column or in the diagonal direction are different.

Specifically, in the 3D display device provided by the embodiment of the present disclosure, the position relationship between the light emitting areas in the electroluminescence display panel 200 and the areas where corresponding first sub-pixels 101 are located in the liquid crystal display panel 100 may have numerous implementations.

Figure 6:
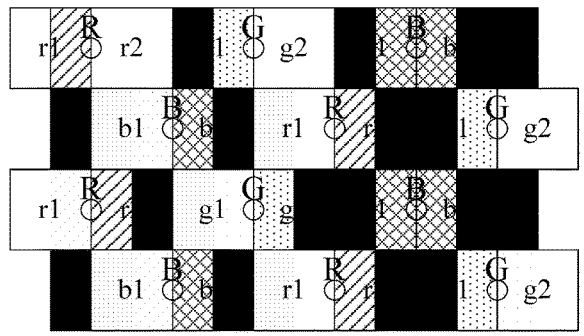
FIGS. 6-8 illustrate top views of 3D display devices according to embodiments of the present disclosure.

One possible implementation is: a center position (shown by a circle in FIG. 6) of each first area 201 (light emitting area) coincides with a center position of an area where at least two corresponding adjacent first sub-pixels 101 in a row are located, as shown in FIG. 6. In FIG. 6, two adjacent first sub-pixels 101 in a row corresponding to one first area 201 are taken as an example. In FIG. 6, the first sub-pixels r1 and r2 correspond to one light emitting area R, the first sub-pixels g1 and g2 correspond to one light emitting area G, and the first sub-pixels b1 and b2 correspond to one light emitting area B. In this implementation, a viewer standing at a position at the central normal of the screen may see a 3D image, but the 3D display cannot be achieved when the screen is rotated by 90 degrees. Therefore, this implementation can achieve the 3D display only in one direction (landscape or portrait).

Figure 7:
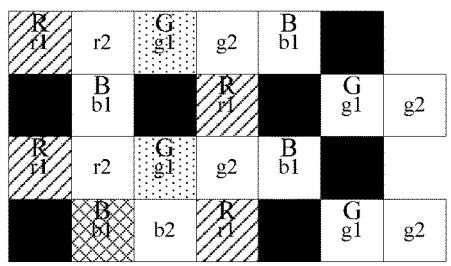
Figure 8:
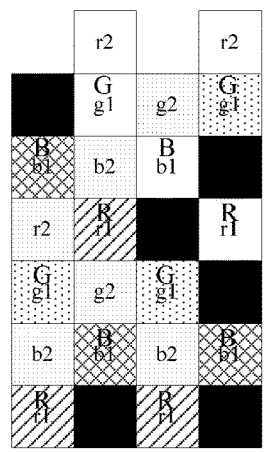

Another possible implementation is: a center position of each first area 201 coincides with a center position of an area where one of at least two corresponding adjacent first sub-pixels 101 in a row is located, as shown in FIGS. 7 and 8. In FIGS. 7 and 8, two adjacent first sub-pixels 101 in a row corresponding to one first area 201 are taken as an example. In FIGS. 7 and 8, the first sub-pixels r1 and r2 correspond to one light emitting area R, the first sub-pixels g1 and g2 correspond to one light emitting area G, and the first sub-pixels b1 and b2 correspond to one light emitting area B. In FIG. 7, the instance in which the left first sub-pixel 101 coincides with each first area 202 is taken as an example, and FIG. 8 is a schematic diagram obtained by rotating FIG. 7 about 90 degrees. It can be seen that after the screen is rotated by 90 degrees and the first sub-pixels 101 corresponding to each first area 201 are changed, the 3D display can also be achieved. Therefore, this implementation can achieve the 3D display in two directions (landscape or portrait). However, the implementation requires the user to change the viewing angle, i.e. the 3D image can be seen at a left viewing angle (FIG. 7) or a right viewing angle (FIG. 8) to the central normal of the screen.

Further, in this implementation, each first area 201 may optionally be square or circular, and may optionally have an aspect ratio of 1:1. This arrangement has the following advantage: the viewing distance of the person's eyes remains the same when the screen is rotated; the luminance of the image is relatively uniform; no great difference is caused in the 3D viewing effect due to the rotation of the screen, thereby facilitating ensuring the viewing effect. Of course, in practical implementations, each first area 201 may have other shapes, which will not be described in detail herein.

Further, in the 3D display device provided by the embodiment of the present disclosure, the arrangement of the first sub-pixels in the liquid crystal display panel 100 may be changed based on the positions of the first areas in the electroluminescence display panel, as shown in FIGS. 3a and 3b. When the electroluminescence display panel is as shown in FIG. 2a and the light colors of two adjacent first areas 201 in the row, in the column or in the diagonal direction in two adjacent rows of first areas 201 are different, two adjacent rows of first sub-pixels in the liquid crystal display panel may be aligned or may be shifted by n first sub-pixels in the column direction. FIG. 3a illustrates the instance in which two adjacent rows of first sub-pixels are shifted by one sub-pixel in the column direction. When the electroluminescence display panel is as shown in FIG. 2b and the light colors of two adjacent first areas 201 in the row, in the column or in the diagonal direction in two adjacent columns of first areas 201 are different, two adjacent columns of first sub-pixels in the liquid crystal display panel may be aligned or may be shifted by n first sub-pixels in the row direction. FIG. 3b illustrates the instance in which two adjacent columns of first sub-pixels are shifted by one sub-pixel in the row direction.

Further, in the 3D display device provided by the embodiment of the present disclosure, in the 2D display mode, individual second areas 202 in the electroluminescence display panel 200 may be black areas or light emitting areas.

Specifically, when the second areas 202 in the electroluminescence display panel 200 are black areas both in the 2D display mode and in the 3D display mode, the first areas 201 and second areas 202 in the electroluminescence display panel 200 may be achieved using second sub-pixels and the second sub-pixels at the second areas 202 are in a non-light emitting state; or, the first areas 201 are achieved using the second sub-pixels and the second areas 202 are achieved using black matrix patterns arranged between the second sub-pixels, i.e. the second areas 202 are areas between the second sub-pixels and covered by the black matrixes.

Specifically, when the second areas 202 in the electroluminescence display panel 200 need to become light emitting areas and no color filter is provided in the liquid crystal display panel, the light color of the second area 202 is the same as that of the adjacent first area 201 in the row on either side, e.g. the light color of the second area 202 may be the same as that of the left adjacent first area 201. In this circumstance, the first areas 201 and second areas 202 may be achieved using the second sub-pixels. When the second areas 202 become black areas in the 3D display mode, the second sub-pixels at the second areas 202 are in the non-light emitting state.

Based on the same inventive concept, an embodiment of the present disclosure further provides a method of driving the above-mentioned 3D display device. The method includes: controlling, in the 3D display mode, the first areas in the electroluminescence display panel arranged under the liquid crystal display panel to emit light; and controlling the first sub-pixels for providing different gray level information of an image for different viewpoints, among the first sub-pixels of the liquid crystal display panel corresponding to the same first area, to display different gray level information.

Further, in order to achieve a 2D display, the method provided by the embodiment of the present disclosure may further include: in the 2D display mode, controlling the first sub-pixels of the liquid crystal display panel corresponding to the same first area to display identical gray level information.

Further, when the first areas and second areas are second sub-pixels, the method provided by the embodiment of the present disclosure may further include: controlling, in the 2D display mode, each of the second areas of the electroluminescence display panel to emit light the same as an adjacent first area in a row on either side.

According to the 3D display device and the method of driving the same provided by the embodiments of the present disclosure, the electroluminescent display panel is arranged under the liquid crystal display panel instead of a conventional backlight module, so that the whole 3D display device is thinned and lightened. In the 3D display mode, light emitting areas and black areas alternately arranged in both the row direction and the column direction are formed in the electroluminescent display panel, so that an abnormal grating structure is formed. In addition to providing backlight for the liquid crystal display panel, the electroluminescent display panel also serves as a rear 3D grating, and extra 3D gratings in front of the liquid crystal display panel are omitted, which facilitates the overall light and thin design of the 3D display device and facilitates the addition of functions such as a touch control function to the front liquid crystal display panel. Further, since the luminance of the electroluminescence display panel is nearly zero in the black state, the black-and-white state contrast ratio is relative high and the formed 3D grating easily obtains low-crosstalk 3D displays. Since each light emitting area (first area) in the electroluminescent display panel corresponds to at least two adjacent first sub-pixels in a row in the liquid crystal display panel and the individual first sub-pixels are used to provide gray level information of an image for different viewpoints, the first sub-pixels corresponding to the same light emitting area (first area) are controlled in the 3D display mode to display different gray level information so that two adjacent viewpoints receive images having different gray level information. The left and right eyes of a person located at the two viewpoints receive two different images and the two different images are combined in the brain as one image through the vision of the eyes, thereby resulting in stereoscopic vision and achieving a naked-eye 3D display at the sub-pixel level.

It will be apparent to those skilled in the art that various modifications and variations may be made to the present disclosure without departing from the spirit and scope of the present disclosure. Thus, it is intended that the present disclosure encompasses such modifications and variations, if such modifications and variations are within the scope of the present disclosure claims and equivalents thereof.

What is claimed is:

1. A three dimensional (3D) display device, comprising:
   a liquid crystal display panel; and
   an electroluminescence display panel behind the liquid crystal display panel;
   wherein the electroluminescence display panel comprises a plurality of first areas and a plurality of second areas, the first areas and the second areas are arranged in both of a row direction and a column direction; and the first areas serve as light emitting areas and the second areas serve as black areas in a 3D display mode; and
   wherein the liquid crystal display panel comprises a plurality of first sub-pixels arranged in an array; every at least two adjacent first sub-pixels in a row correspond to one of the first areas; and in the 3D display mode, among the first sub-pixels corresponding to an identical one of the first areas, the first sub-pixels for providing gray level information of an image for different viewpoints display different gray level information;
   wherein in the 3D display mode, in addition to providing backlight for the liquid crystal display panel, the electroluminescent display panel serves as a rear 3D grating with no extra 3D grating in front of the liquid crystal display panel.

2. The 3D display device according to claim 1, wherein the first sub-pixels corresponding to the identical one of the first areas display an identical gray level in a 2 dimensional (2D) display mode.

3. The 3D display device according to claim 1, wherein the liquid crystal display panel is a black-and-white liquid crystal display panel;
   the first areas in the electroluminescence display panel have three different light colors; and
   among two adjacent rows or columns of the first areas, every two adjacent first areas in a row, in a column or in a diagonal direction have different light colors.

4. The 3D display device according to claim 3, wherein the second areas in the electroluminescence display panel serve as the black areas in a 2D display mode.

5. The 3D display device according to claim 4, wherein the first areas and the second areas are second sub-pixels; or,
   the first areas are the second sub-pixels, and the second areas are areas between the second sub-pixels and covered by a black matrix.

6. The 3D display device according to claim 3, wherein in a 2D display mode, the light color of each of the second areas in the electroluminescence display panel is identical to the light color of the adjacent first area that is in the same row as the each of the second areas and on either side of the each of the second areas.

7. The 3D display device according to claim 6, wherein the first areas and the second areas are second sub-pixels.

8. The 3D display device according to claim 1, wherein a center position of each of the first areas coincides with a center position of an area where at least two corresponding adjacent first sub-pixels in a row are located.

9. The 3D display device according to claim 1, wherein a center position of each of the first areas coincides with a center position of an area where one of at least two corresponding adjacent first sub-pixels in a row is located.

10. The 3D display device according to claim 9, wherein each of the first areas is square or circular, and each of the first sub-pixels has an aspect ratio of 1:1.

11. A method of driving the 3D display device according to claim 1, the method comprising:
    in a 3D display mode, controlling the first areas in the electroluminescence display panel behind the liquid crystal display panel to emit light; and
    controlling the first sub-pixels for providing gray level information of an image for different viewpoints, among the first sub-pixels of the liquid crystal display panel corresponding to an identical one of the first areas, to display different gray level information.

12. The method of claim 11, further comprising:
    in a 2D display mode, controlling the first sub-pixels of the liquid crystal display panel corresponding to the identical one of the first areas to display identical gray level information.

13. The method of claim 11, wherein the first areas and the second areas are second sub-pixels, and
    the method further comprises:
    in the 2D display mode, controlling each of the second areas of the electroluminescence display panel to emit light the same as the adjacent first area in the same row as the each of the second areas and on either side of the each of the second areas.

* * * * *